United States Patent [19]

Irving

[11] 4,239,032
[45] Dec. 16, 1980

[54] PORTABLE WATER CARRIERS

[76] Inventor: Leslie F. Irving, 60 New Rd., Bromsgrove, Worcestershire, England

[21] Appl. No.: 879,967

[22] Filed: Feb. 21, 1978

[30] Foreign Application Priority Data

Feb. 23, 1977 [GB] United Kingdom ................ 7533/77

[51] Int. Cl.³ .......................... F24J 3/02; B65D 23/00
[52] U.S. Cl. .................................... 126/437; 126/450; 215/1 C
[58] Field of Search ............... 126/270, 271, 437, 450, 126/432; 237/1 A; 215/6, 1 C

[56] References Cited

U.S. PATENT DOCUMENTS

| 2,388,940 | 11/1945 | Taylor | 126/271 |
|---|---|---|---|
| 2,998,006 | 8/1961 | Johnston | 126/271 |
| 3,277,883 | 10/1966 | Rowekamp | 126/271 |
| 3,987,782 | 10/1976 | Meier, Jr. | 126/271 |
| 4,006,730 | 2/1977 | Clapham et al. | 126/271 |
| 4,127,103 | 11/1978 | Klank et al. | 126/450 |

FOREIGN PATENT DOCUMENTS 295900  11/1971  U.S.S.R. ................................ 126/432

Primary Examiner—James C. Yeung
Attorney, Agent, or Firm—Albert L. Jeffers; Roger M. Rickert

[57] ABSTRACT

A portable water container which incorporates a solar heating panel. One wall of the portable container consists of an outer transparent/translucent panel and an inner heat-absorbing panel which is spaced from the outer panel. The inner panel may be ribbed or otherwise formed to improve heat-exchange.

5 Claims, 8 Drawing Figures

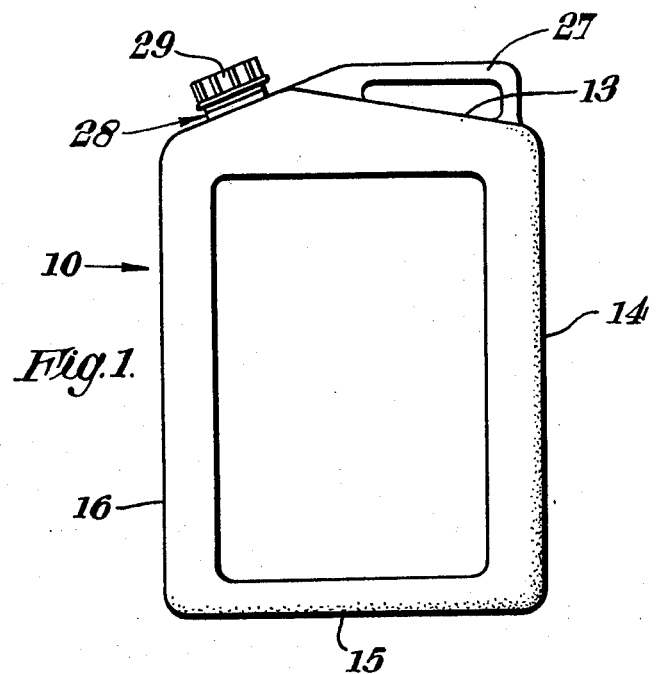
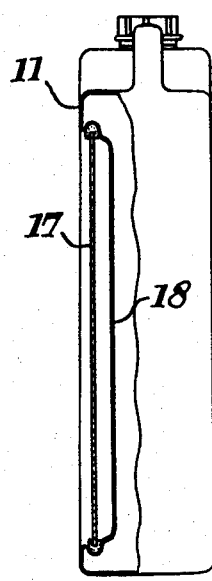
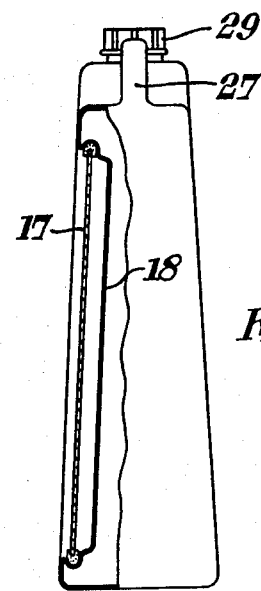
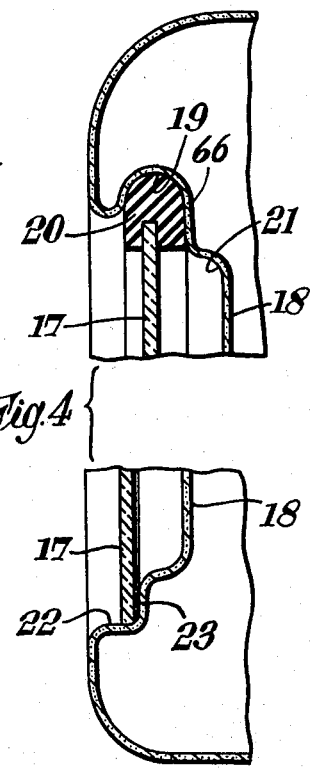

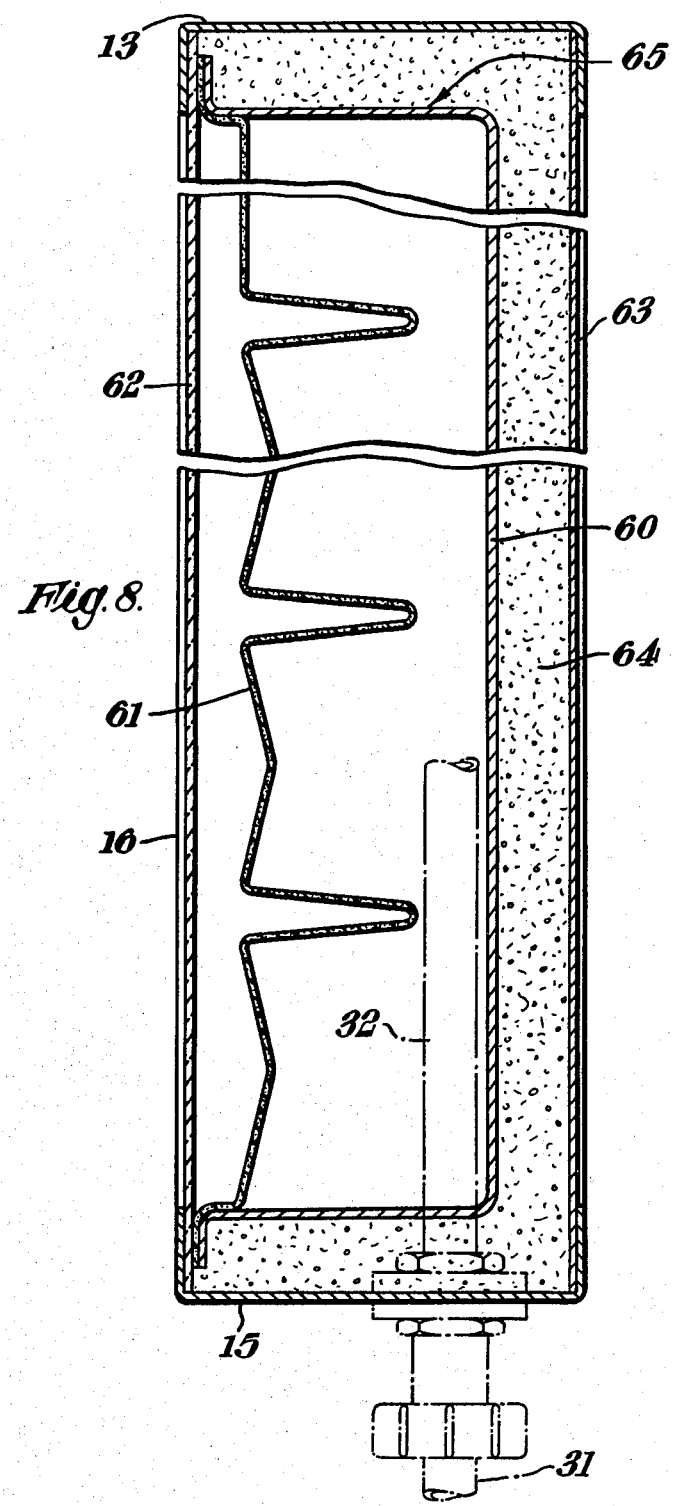

PORTABLE WATER CARRIERS

This invention relates to portable water carriers.

The present invention consists in a water container which includes two opposed spaced walls which are connected to one another along their corresponding peripheries by side walls in order to enclose a space for the storage of water, one of said two opposed spaced walls comprising a first and outer panel of transparent or translucent material spaced from a second and inner panel of material which has a greater coefficient of thermal conduction than any other part of said container, whereby radiant heat emitted by the sun and falling on said first panel passes through said first panel and falls on said second panel which is thereby heated and which transmits its heat to the water stored in said container.

In a first embodiment, the second panel is integral with the other of the opposed spaced walls and with said side walls. In such a case, the margin of said first panel may be attached by means of a suitable adhesive and the second panel may be spaced from the first panel by being recessed. Alternatively, the periphery of said first panel may be supported by an annular seal of elastomeric material which is accommodated in a continuous groove which frames said recess. In said first embodiment, the other of said two opposed spaced walls and the side walls and the said second panel may all be made from the same material and the outer surface of the second panel may be coated with a coating material which will ameliorate the heat-absorbing properties of said material; the bond of the coating to said outer surface should be such as not to be destroyed or adversely affected by the heat developed in the second panel.

In an alternative embodiment, the container may be so formed that an annular seal made of an elastomeric material is accommodated in a continuous groove which frames an aperture in said one of said two opposed spaced walls, said seal being used for the support of and sealed connection of the first panel and the second panel, said second panel being metal. Said metal sheet may be provided with heat-dissipating fins extending from the inner face thereof into the enclosed space. The preferred metal could be copper but aluminium is cheaper and will probably have the required coefficient of thermal conductivity.

In one preferred embodiment of water container according to the present invention, said container comprises three main components of which two have the forms of open-topped boxes which are so placed one within the other and are so connected to one another when so nested as to define a fluid-tight enclosed space; the bottom wall of one of said open-topped boxes being recessed into said enclosed spaced; the third component being said first and outer panel and being secured to said one of said open-topped boxes so as to define an air gap between the outer surface of the recessed portion of said one open-topped box and the inner surface of said first and outer panel. As a further development thereof, said three main components may be incorporated in a supporting frame which additionally supports a back panel; the inner surface of the back panel and the inner surfaces of the supporting frame all being spaced from the opposite surface(s) of said other of the open-topped boxes and said space being filled with a heat-insulating material.

The present invention will now be more particularly described with reference to the accompanying drawings, in which:

FIG. 1 illustrates, in side elevation, one embodiment of a water container according to the present invention;

FIGS. 2 and 3 illustrate diagrammatically two different cross-sectional shapes, the section line being normal to the plane of the paper of FIG. 1;

FIG. 4 illustrates diagrammatically two different modes of support of and sealed connection of a panel of transparent or translucent material in or to a water container wall;

FIG. 8 illustrates a section through the container in FIG. 7 and shows the mode of construction thereof.

Figure 5:
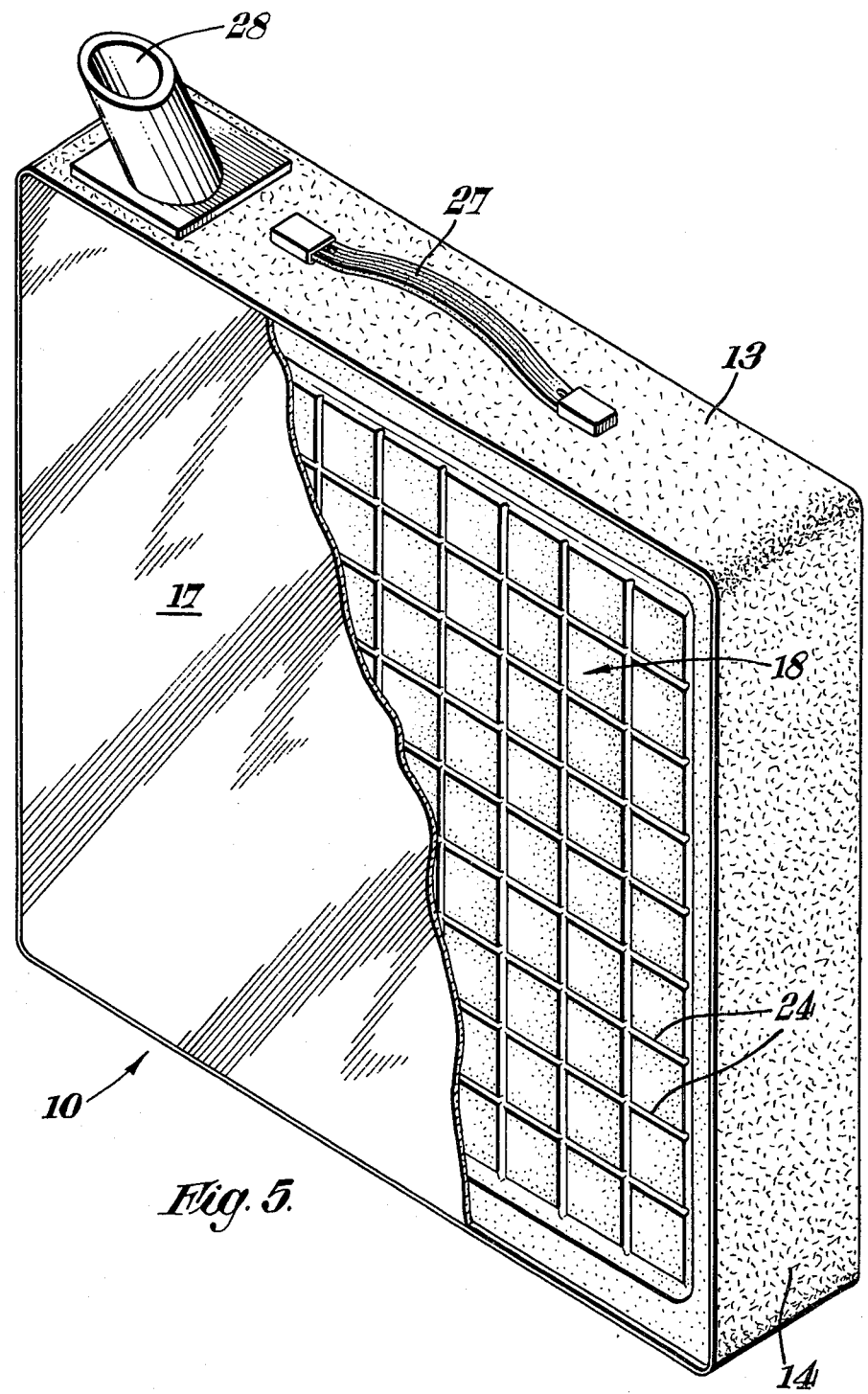
FIG. 5 illustrates, in perspective and partly cut away, another embodiment of a water container according to the present invention.

Referring now to the drawings, there is illustrated therein a water container 10 which includes spaced opposed walls 11, 12 which are connected to one another along their corresponding peripheries by side walls 13, 14, 15, 16 in order to enclose a space for the storage of water, the wall 11 comprising a first and outer panel 17 made of a transparent or translucent material and a second and inner panel 18 made of a material having a greater coefficient of thermal conduction than any other part of said container, the two panels 17 and 18 being spaced from one another, whereby radiant heat emitted by the sun and falling on said panel 17 passes through said first panel and is thereby converted into sensible heat which is transmitted to the water by said second panel 18.

The first panel 17 will preferably be made of clear, ultra-violetstabilised polyvinyl chloride material but may be made of Perspex. In one embodiment, as shown in FIG. 4, the second panel 18 has an integral peripheral extension portion 66 which is integral with the sidewalls 13, 14, 15 and 16 and with wall 12. In one support mode, the periphery of the panel 17 is mounted in a seal 20 (made for example of an elastomeric material) which is seated in a continuous groove 19 formed in extension portion 66 and which frames a recess 21, the material of the water container being appropriately moulded to form said groove 19 and recess 21 integrally with the remainder of the container body. In another support mode, the panel 17 is more simply mounted in a recess formed by a step portion 22 in extension portion 66, the margin of panel 17 being connected in a sealed manner at 23 to the step portion 22.

Figure 6:
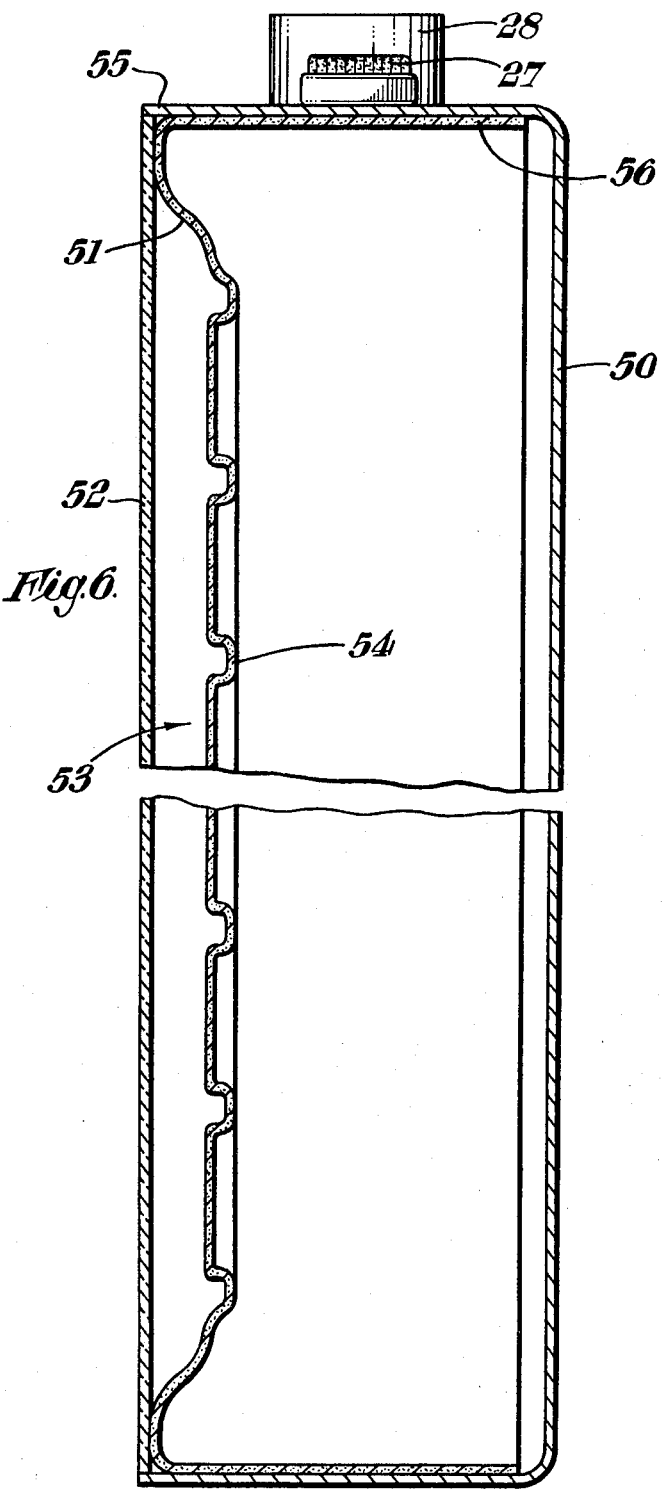
FIG. 6 illustrates a section through the container in FIG. 5 and shows the mode of construction thereof.
Figure 7:
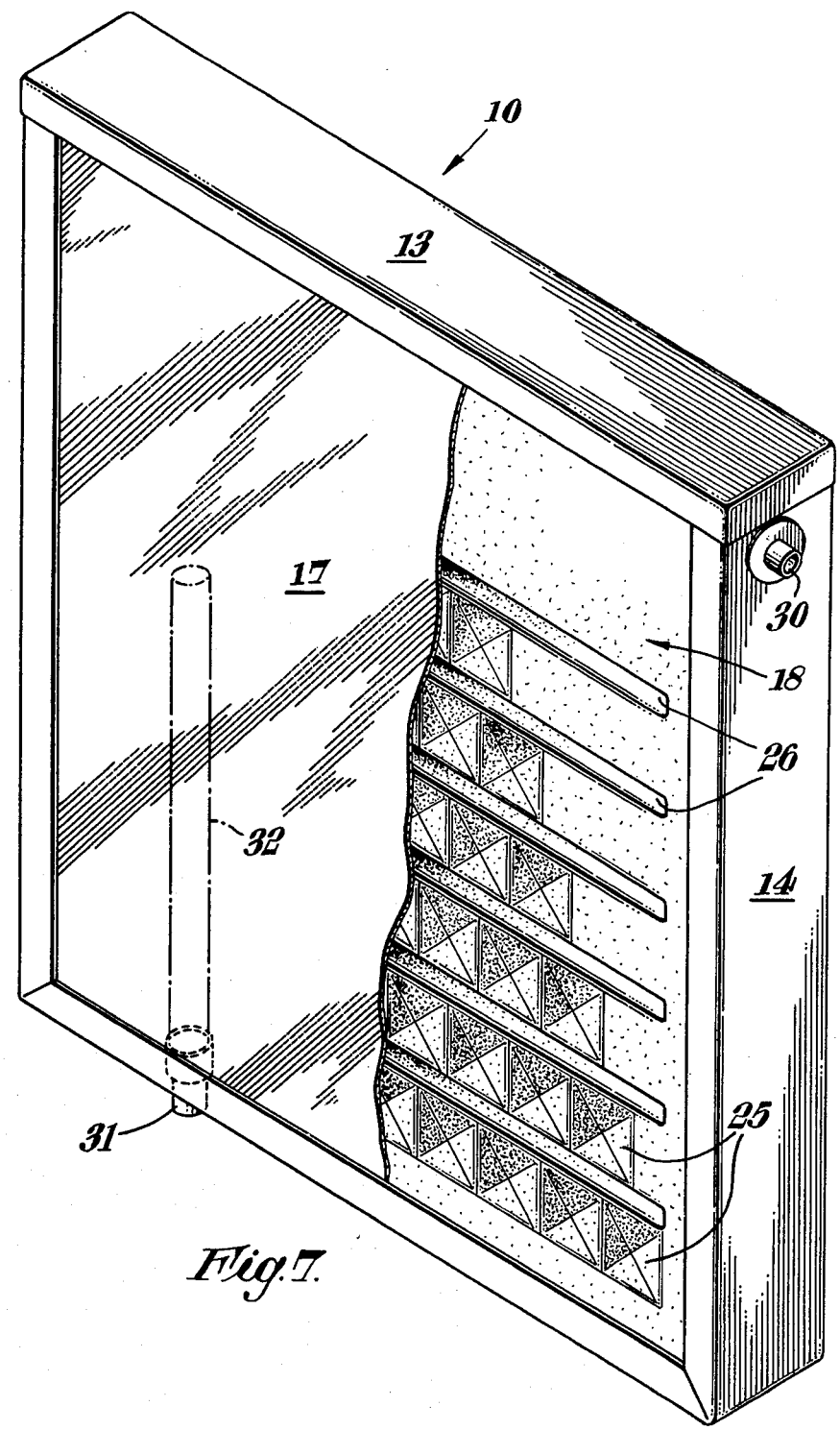
FIG. 7 is a view, similar to the one of FIG. 5, of yet another water container according to the present invention.

In the embodiments illustrated in FIGS. 1 to 4, the surfaces of the panels 18 are flat (namely, not ribbed) whereas, in the embodiments illustrated in FIGS. 5 to 8, said surfaces are ribbed or otherwise increased in area to improve the heat-exchange capabilities thereof. In FIGS. 5 and 6, it will be seen that, panel 18 has longitudinally and transversely arranged fairly shallow grooves therein to ameliorate heat-transfer. In FIGS. 7 and 8, it will be seen that the panel 18 has parallel portions 25 each of which consists of conjoined elements of which each element has four triangular faces so joined to one another as to resemble four of the surfaces of a right pyramid; the portions 25 are separated from one another by re-entrant portions 26 which, on the water-contacting side of the panel 18, constitute heat-exchange fins projecting into the water.

In another alternative embodiment which is not illustrated, the panel 18 is made of metal, the metal panel being supported in a manner similar to that shown for the panel 17 in FIG. 2. In this other alternative embodiment, both panels 17, 18 will be similarly supported in appropriately fashioned groove(s) and seal(s), a space being left between them and the panel 18 being the inner one. Thus, if both of those panels 17, 18 were to be removed, there would be uninterrupted access to the interior of the container.

The measurements of the exemplary embodiment illustrated in FIGS. 1 to 4 are 19 inches by 14 inches by 5 inches, those of the exemplary embodiment illustrated in FIGS. 5 and 6 are 18 inches by 16 inches by $3\frac{3}{8}$ inches and those of the exemplary embodiment illustrated in FIGS. 7 and 8 are 36 inches by $5\frac{1}{4}$ inches.

In one form of the water container according to the invention, said container will be provided with a carrying handle 27 and an apertured nozzle 28 which is closable by a readily removable cap 29 and which enables the container to be filled and emptied (see FIGS. 1 to 5). In an alternative form, said water carrier could consist of a much larger but still easily portable tank (see FIGS. 7) which could be suspended, for example, on a dry stone wall in a field or on the wall of a house, such tank having not only a filling device 30 and closure means therefor (not illustrated) at or in the vicinity of the top edge thereof, but also an emptying device 31 and closure means therefor (not illustrated at or in the vicinity of the bottom edge thereof). The emptying device 31 could be connected either to a length of hose or to some other inpermanent form of pipework, in association with some form of tap. The device 31 is preferably the lowest and projecting portion of a pipe 32 which extends upwardly inside the container 10 in order to be able to take off the hottest fraction of the water at any time. The filling device 30 will preferably be associated with some kind of valve to prevent overfilling, and an overflow pipe will be provided.

Referring to FIG. 6, it will be seen that the container is conveniently made from three main components (ignoring the handle 27 and the nozzle 28). A first component 50 having the form of an open-topped box, a second component 51 having also the form of an open-topped box and a flat sheet component 52 are joined to one another over their respective mutually contacting surfaces or surface portions, for example by waterproof adhesives which will not be liable to deterioration under the effects of heat. The cross-sectional form of the component 51 provides not only the essential airspace 53 when the component 52 has been secured to the component 51 but also the small heat-exchange fins 54 (if desired) and the correct location of the component 51 within the component 50 by virtue of the respective heights or lengths of the sides 55, 56.

Referring to FIG. 8, it will be seen that the container is conveniently made from four main components 60, 61, 62 and 63 and the walls 13, 14, 15, 16. The component 60 is of open-topped box form, the component 61 is specially formed to provide an enlarged surface area for heat exchange purposes, said components 60, 61 having flanges which are secured to one another in water-tight-fashion. The components 62, 63 are both sheets, the component 63 serving as the back plate and being spaced from the component 60 as so to provide a space into which is packed a heat-insulating material 64, which is also carried around the sides of the component 60 as illustrated. The walls 14, 15, 16 will preferably be extrusions of polyvinyl chloride whereas the wall 13 constitutes a removable lid; said lid needs to be removable and an access aperture, whose position is generally indicated by the arrow and the reference numeral 65, needs to be provided in the component 60 in order to facilitate repair, adjustment or the like of the valve (for example, a ballcock type of valve) which cuts off the supply of water to the container.

In the embodiment of water carrier in which the material from which the outer surface of the panel 18 of the container is made is coated, I have found that quite a thin coating of NEXTEL is quite adequate. NEXTEL (Trade Mark) is marketed by the Decorative Products Division of 3 M United Kingdom Limited and is used by that company to identify their brand of what is described as a reflective paint or air-dry enamel. I have used NEXTEL black, 101-C 10 and have applied it by means of an appropriate spraying device to the outer surface of one wall of a water carrier made from a high density polythene in order to form said second panel in said first embodiment. However, I have found that the panel 18 which is illustrated for example in FIG. 5 and which is made of black, high impact, weatherproof, ultra-violetstabilised polystyrene has also given excellent results and is cheaper than the coated material described earlier in this paragraph.

The width of the essential gap between the inner surface of the first panel 17 and the outer surface of the second panel 18 in any of the embodiments described above is not critical, but I have found that a gap $\frac{5}{8}$ of an inch wide gives good results. The width of the gap could, of course, be increased to something of the order of $1\frac{1}{2}$ inches wide.

What I claimed is:

1. A portable water container including two opposed spaced walls connected by side walls to enclose a space for the storage of water, one of said two opposed walls comprising a first, outer panel of light-transmissive material and a second, inner panel integral with the other of the opposed spaced walls and with said side walls and spaced from said first panel to form a gap, said second panel having an integral, peripheral extension portion with said first panel sealingly connected thereto, said second panel having a greater coefficient of thermal conduction than any other part of said container, whereby radiant heat emitted by the sun and falling on said first panel passes therethrough and falls on said second panel which is thereby heated and which transmits its heat to the water stored in said container.

2. A water container as claimed in claim 1, wherein said second panel extension portion includes a step portion, the margin of said first panel being adhesively attached to said step portion thereby spacing said second panel from said first panel.

3. A water carrier as claimed in claim 1, wherein said second panel extension portion defines a continuous groove, the periphery of said first panel being supported by a seal of elastomeric material seated in said groove.

4. A portable water container including two opposed spaced walls connected by side walls to enclose a space for the storage of water, one of said two opposed walls comprising a first, outer panel of light-transmissive material and a second, inner panel spaced from said first panel to form a gap, said second panel having an integral, peripheral extension portion with said first panel sealingly connected thereto, the other of said two opposed spaced walls and the side walls and second panel all being made from the same material and wherein the outer surface of the second panel is coated with a coating material which will ameliorate the heat absorbing properties of said material, said second panel having a greater coefficient of thermal conduction than any other part of said container, whereby radiant heat emitted by the sun and falling on said first panel passes therethrough and falls on said second panel which is thereby heated and which transmits its heat to the water stored in said container.

5. A portable water container including two opposed spaced walls connected by side walls to enclose a space for the storage of water, one of said two opposed walls comprising a first, outer panel of light-transmissive material and a second, inner panel spaced from said first panel to form a gap, said second panel having an integral, peripheral extension portion with said first panel sealingly connected thereto, said second panel extension portion being connected to said side walls and defining a continuous groove, said first panel being connected to said second panel by a seal of elastomeric material seated in said groove, said second panel being metal, said second panel having a greater coefficient of thermal conduction than any other part of said container, whereby radiant heat emitted by the sun and falling on said first panel passes therethrough and falls on said second panel which is thereby heated and which transmits its heat to the water stored in said container.

* * * * *